Dec. 15, 1936.                  L. D. JONES                    2,064,798
                     APPARATUS FOR PURIFICATION OF OIL
                           Filed March 25, 1932          2 Sheets-Sheet 1
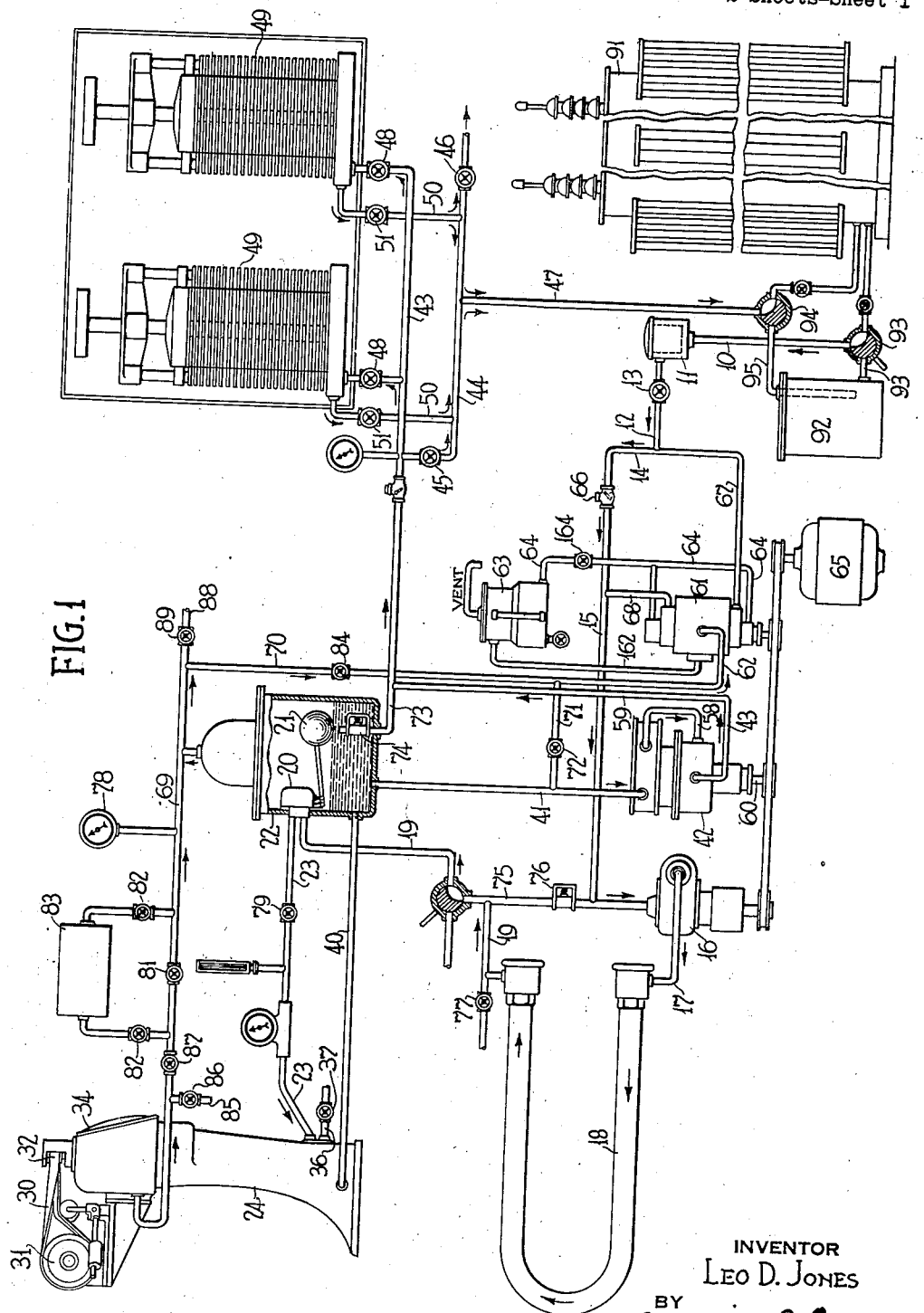
INVENTOR
LEO D. JONES
BY
Maurice A. Crews
ATTORNEY

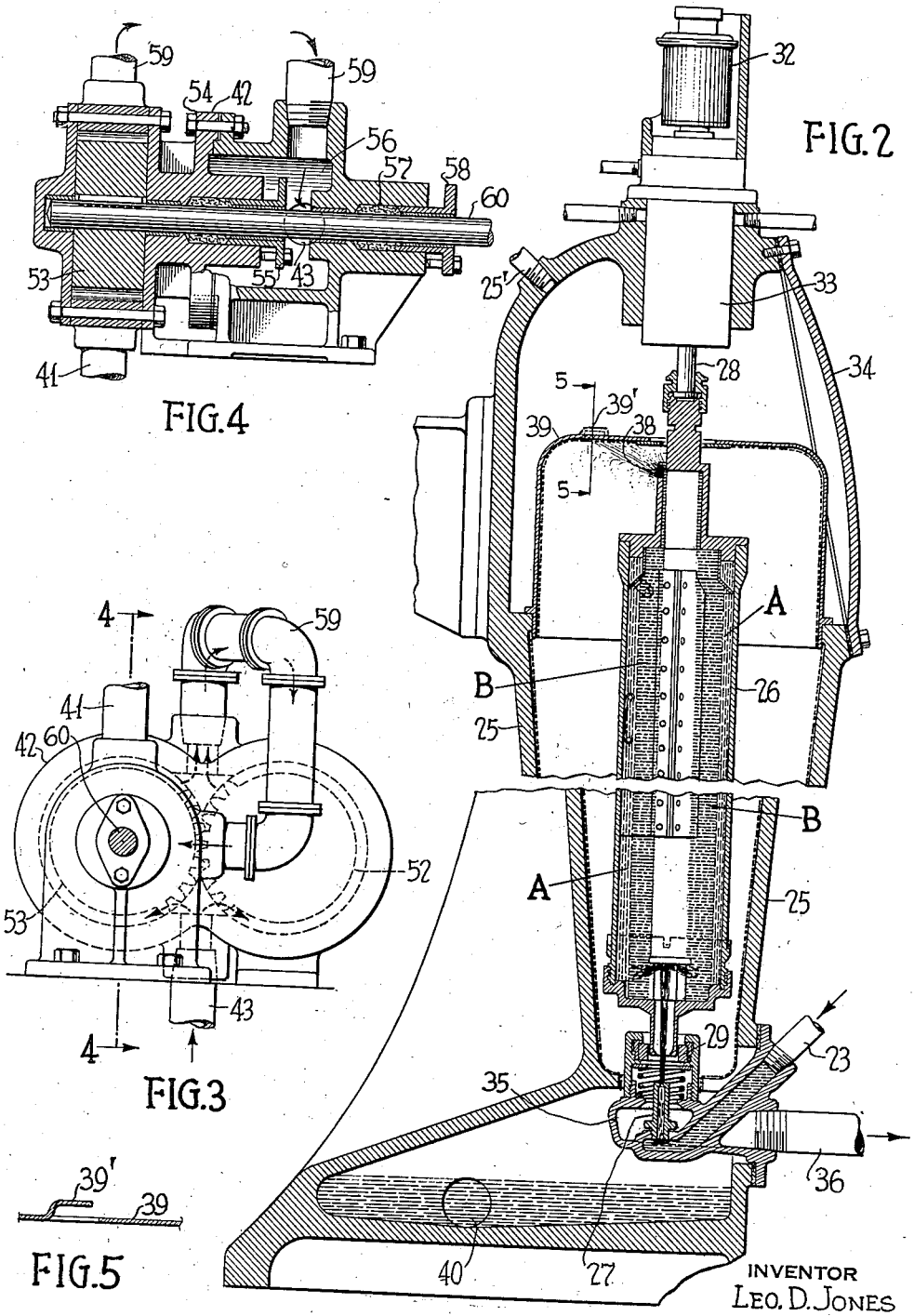

Patented Dec. 15, 1936

2,064,798

UNITED STATES PATENT OFFICE 2,064,798

APPARATUS FOR PURIFICATION OF OIL

Leo D. Jones, Philadelphia, Pa., assignor to The Sharples Specialty Company, Philadelphia, Pa., a corporation of Delaware Application March 25, 1932, Serial No. 601,105

6 Claims. (Cl. 233—13)

This invention relates to a method and apparatus for the purification of fluids of various types and is a continuation in part of my prior application, Serial Number 22,727, filed April 13, 1925, now matured into Patent No. 1,872,963, dated August 22, 1932 for Method and apparatus for separating substances. One of its most important applications is in the purification of oils which are to be used for insulating purposes, regardless of whether such oils are freshly obtained from petroleum or contaminated by previous use. By the use of my process and apparatus, such oils are purified so thoroughly that they are brought to a condition in which they are highly effective for insulating purposes.

A feature of the invention consists in the purification in such a manner that the oil produced by the system is substantially free of impurities such as solids, liquids and gases suspended in the oil and that the vast majority of dissolved impurities such as volatile liquids and gases are likewise removed. Of this last named class of substances, moisture and oxygen have an especially deleterious effect upon insulating oil and it has been a very particular object of my invention to eliminate such impurities from the oil in as thorough a manner as possible.

A further feature of the invention consists in the separation of the suspended and dissolved impurities referred to above in a single operation in which a plurality of different treatments of the oil each effect a purification operation with respect to certain of the impurities in the oil. More specifically, my invention contemplates the removal of undissolved impurities such as solids and liquids by the action of centrifugal force and the removal of dissolved impurities such as liquids and gases in solution by a control of the atmospheric conditions in which such separation is effected and into which the liquid to be purified is projected in dispersed form at the completion of such centrifugal separation.

An important aspect of my invention consists in the retention of the solids and liquids separated from the oil by centrifugal force within the separator bowl where they are not subjected to the influence of the selective atmosphere in which the second purifying step takes place. In the release of the oil from the bowl the dispersion of the oil effected within the bowl and upon its discharge therefrom renders it peculiarly susceptible to the influence of the atmosphere into which it is discharged. I take advantage of this fact in the practice of my invention by subjecting the oil from which undissolved solid and liquid impurities have been removed by centrifugal sedimentation, to a selective atmosphere adapted to effect a further purification of the oil by a removal of gaseous and/or liquid impurities. This atmospheric treatment is preferably performed while the oil is still in a dispersed state due to its centrifugal discharge. Such an atmosphere may consist of a chamber which is partially evacuated by subjection to the action of a vacuum pump or it may consist of a relatively moisture-free inert gas. Such an atmosphere has a double advantage over an ordinary atmosphere in that it removes dissolved impurities from the oil at the same time that it prevents further contamination thereof such as would occur if the oil were projected directly into an atmosphere containing a normal percentage of the free oxygen and water vapor.

By retaining the water and other liquid and solid impurities removed from the oil in the centrifuging operation within the separator bowl, I avoid contamination, by the vapors of such impurities, of the atmosphere outside of the bowl which has been conditioned to remove dissolved impurities. These liquid impurities which are separated from the oil within the bowl are of higher specific gravity than the oil itself and are thus thrown outwardly against the inner circumference of the bowl during the operation of centrifugal separation, the oil being drawn off through a port in the bowl lying radially inwardly of the peripheral space occupied by such removed liquid layer. The layer of water which has thus been projected against the periphery of the bowl is thus sealed off by the layer of oil lying radially inwardly of the water layer from communication with the oil which has been removed from the bowl. This oil within the bowl as well as the water itself is being constantly subjected to the influence of centrifugal force and there is thus a strong pressure due to said force counteracting the natural vapor pressure of the water. As a result of this counteracting pressure the layer of water separated from the oil in the centrifuging operation is effectively sealed from the oil which has been removed from the centrifuge. As a result of this seal, the vapor of the water within the bowl is incapable of contaminating the specially conditioned atmosphere to which the oil is subjected after discharge from the bowl.

In certain cases oil containing a very high water content may be treated in accordance with my invention. If such oil were passed directly to the apparatus described above, the centrifugal separator bowl might become filled with water so rapidly as to seriously impair the efficiency of my system by reason of the frequent shutdowns which would be necessary in order to remove the water from the bowl. In the treatment of such oils, I therefore propose to subject the oil to a preliminary centrifuging operation in order to remove a large portion of the suspended water before it is subjected to my combined centrifuging and vapor removing apparatus.

In the practice of this invention, the atmosphere contacting the oil while in its dispersed state and even up to the time when the oil is to be put in use, is carefully conditioned and such conditioning may consist in the reduction to a sub-atmospheric pressure without other special treatment or it may consist in the provision of a special neutral gas which may be maintained at atmospheric or sub-atmospheric pressure. In special treatments it may be desirable to use air at normal atmospheric pressure after it has been especially conditioned by the removal of a certain portion of its moisture and oxygen content. Removal of moisture and/or oxygen may be effected, for example, by circulation of the air in contact with a deoxygenating element or influence, of which an example is described in Patent No. 1,557,092 to Clarence J. Reilly, and in contact with any moisture absorber such as calcium chloride. Either alternatively to the aforementioned treatment or in addition thereto, the oxygen and moisture content of the atmosphere may be reduced by circulating it for a suitable time in contact with a body of oil adapted to absorb oxygen and moisture therefrom before it is brought into contact with the particular body of oil under treatment. Other possible methods of effecting the desired removal of oxygen from the atmosphere and removal of these undesired constituents from the atmosphere consist in the combustion of phosphorous or manganese or the displacement of these constituents from the atmosphere by the opening of a capsule of carbon dioxide or the evaporation of a body of solid carbon dioxide within the apparatus.

While the method and apparatus of my invention may be used in many connections, they have been particularly designed with reference to the treatment of oil to be used for insulating purposes such, for example, as the insulation of transformers and switch casings. Such oils must have a high resistance to emulsification and a high dielectric strength and electric resistance. Accordingly, oil for such use must be free of suspended solids and water and free of dissolved moisture and should also preferably be virtually free of dissolved gases and particularly of dissolved oxygen. When such oils are freshly prepared from petroleum they usually contain dissolved moisture and also suspended solids and after they have been used they contain both free and dissolved moisture and other solids resulting from decomposition occurring in the use of the oil. Such last mentioned solids include colloidal and crystalline carbon and products of polymerization. In accordance with this invention, such insulating oils are heated to a temperature between 120° Fahrenheit and 160° Fahrenheit and are thereafter subjected to the treatment described above in order to purify them to a state in which they have the desired characteristics. Further objects, features and advantages of the invention will be apparent from the attached drawings illustrating preferred embodiments thereof when read in the light of the attached specification. In these drawings—

Figure 1 is a schematic view partly in side elevation, partly in plan and partly in section illustrating the arrangement of the apparatus.

Figure 2 is a cross section through the centrifugal separator forming an important part of the apparatus, illustrating the interior construction thereof.

Figure 3 is a side elevation of an oil pump forming a part of my system.

Figure 4 is a cross section on the line 4—4 of Figure 3.

Figure 5 is a cross section on the line 5—5 of Figure 2.

Referring to the drawings by reference characters, oil is fed from the closed and sealed transformer casing 91 into the system through a suitable pipe 10 which leads to a strainer 11 of any suitable design through which the oil is fed to a pipe 12 containing a control valve 13. From the pipe 12 the oil passes through pipes 14 and 15 to a pump 16 which in turn feeds it to the purifying apparatus. This pump discharges the oil into the pipe 17 from which it is passed to a heater 18 which may be of any suitable design capable of accurately controlling the heat of the oil, it being preferably an electric heater.

From the heater 18 the oil is passed by pipe 19 to valve 20 which is preferably a valve of the balanced pressure type and is operated by a float 21 to restrict the flow of oil therethrough in case the liquid level within the tank 22 becomes too high. From the valve 20 the oil passes by pipe 23 to feed nozzle 27 of a centrifuge 24.

Centrifuge 24 includes a casing 25 within which a rotor 26 is suspended by spindle 28 and receives liquid from nozzle 27. The lower end of the rotor is guided by a conventional drag element 29; and the spindle is rotated by a belt 30 driven by motor 31 and acting upon pulley 32. The interior of the centrifuge casing may be sealed from the outside atmosphere in any suitable manner, as for example, by the system shown in Patent No. 1,806,929 to W. H. Bath, this sealing mechanism being contained within the housing 33. Casing 25 is provided with a removable closure 34 in order to facilitate access to the interior of the casing and enable the necessary repairs and adjustments to be made. The body of the rotor is imperforate.

Solids and liquids separate from the oil within the rotor and are retained within the rotor because of its imperforate nature and the oil freed from impurities in this manner is discharged from passage 38 in a highly dispersed condition in which it is very susceptible to the influence of the atmosphere contacting it. Dispersed particles are deflected downwardly by annular hood-like member 39 and liquid flows in a thin film on the inner surface of this hood-like member and the casing 25 in contact with the atmosphere within the casing and hood. This liquid flows into a sump in the base of the centrifuge and is thence discharged into the pipe 40 which carries it into the tank 22 which is sealed from the atmosphere and subjected to the action of a vacuum pump or other suitable atmospheric conditioning apparatus.

The atmosphere within the casing 25 is conditioned by means of special apparatus to insure the absorption of a major part of the oxygen and moisture remaining in the oil after the centrifuging operation and this conditioning operation is preferably performed similarly upon the atmosphere above the oil level in the tank 22 as well as upon that within the centrifuge casing. The hood 39 is provided with a plurality of annularly arranged openings 39' which permit conditioning of the atmosphere therein by external apparatus communicating with the interior of the casing through a port 25'. These openings 39' are formed by providing slits in the top of the hood and forming these slits outwardly to form hooded openings in a vertical plane, the hoods of the openings extending diagonally upward in a direction opposite to the direction of rotation of the rotor in order to preclude the ejection of oil thru these openings. The construction of the openings in the hood is illustrated in cross section in Figure 5. Upon stopping of the rotor the contents thereof are drained into chamber 35 which leads into pipe 36, and discharged from the machine by control of the valve 37.

Liquid from tank 22 is pumped from pipe 41 by means of pump 42 to a discharge pipe 43. From this discharge pipe it may be passed under control of valve 45 and discharged from the purifying system through pipes 44 and 47 from which it is returned to the transformer or to another suitable closed container. If it is found necessary to remove further impurities from the oil, however, to complete the renovation or preliminary conditioning thereof, such oil may be passed through filters 49 which are controlled by valves 48. In case these filters are used, oil is discharged from these filters through one or both pipes 50 under the control of valves 51 and thence returned through pipes 44 and 47. The filters may be of any desired conventional design.

Pump 42 should be of such design that a very low pressure may be maintained within the centrifuge casing 25 and tank 22 and the pipes and apparatus connecting these elements. In order to effect this result, it is, of course, necessary that the receiving end of the pump be effectively sealed against the entrance of atmospheric gases. For this purpose I prefer to use a gear pump of special design as illustrated in Figures 3 and 4. The driving shaft 60 of the pump is provided with packing 54 which is compressed by a gland 55 and the resulting packed joint is surrounded by a chamber 56 in the pump casing which is in turn protected from access of the atmosphere by a packing 57 compressed by gland 58. A U shaped pipe 59 receives oil which is pumped from the pipe 41 by the gears 52 and 53 of the pump and conveys it into the annular chamber 56 described above. Oil is discharged from chamber 56 through pipe 43 as illustrated in the drawings.

The oil in pipe 59 will always be under super-atmospheric pressure by reason of the effect of the pump thereon and this super-atmospheric pressure acts upon the oil in the annular chamber 56 to effect a compression of the packings 54 and 57 upon opposite sides of the annular chamber. The oil within the pipe 41 and within the portion of the pump casing in which the gears 52 and 53 are contained is thus protected from contamination by the outside atmosphere by the two packing glands and additionally by the body of oil in the chamber 56. Furthermore, the pressure of the oil within this chamber acting against the packings exerts a counteracting pressure to the atmospheric pressure tending to cause leakage past the packing 57 and thus effectively precludes inward leakage.

In the preferred embodiment of the invention, the atmosphere within tank 22 and within the casing 25 is evacuated by the action of a vacuum pump 61. This vacuum pump draws gas from pipe 62 and delivers it at a pressure which exceeds atmospheric pressure through pipe 162 to vented oil separator 63 from which oil passes through lubricating pipes 64 to the pump 61. Pumps 16, 42 and 61 may be driven by any suitable means as for example by a drive from a common motor 65. Oil pipe 15 is provided with a ball check valve 66 from opposite sides of which lead oil pipes 67 and 68 through passages in the vacuum pump 61. The resistance to flow of the valve 66 may be suitably adjusted to cause a by-passing of a controlled quantity of oil from the pipe 14 through the pipe 67 in order to effect the desired cooling of the vacuum pump. In this manner, I am enabled to effect the desirable results of preliminary heating the oil and effecting a cooling of the vacuum pump by a single simple expedient. The preliminary heating of the oil in this manner enables me to utilize a smaller degree of power in the heating operation in the coils 18 and thus increase the efficiency of the system.

The vacuum pump 61 communicates with the top of the container 22 and with the centrifuge casing through a system of piping 62, 70 and 69 and thus serves to evacuate the atmosphere within these containers. The pipe 70 communicates with the oil line 41 leading from the chamber 22 to the oil pump 42 through a by-pass 71 and this connection serves to effect the desired preliminary evacuation of the atmosphere within this part of the system and avoid an air lock therein. This last named passage is controlled by valve 72 which is only maintained open for a short time at the commencement of the operation upon any given body of liquid. It will be understood that Figure 1 of the drawings is largely diagrammatic, parts being shown in elevation and parts in plan. The position of by-pass 71 is accordingly somewhat deceptive in this view, as the connections of this pipe with the pipes 70 and 41 are on approximately the same horizontal level with the base of the tank 22 and a portion of this pipe extends into a plane considerably thereabove. Flooding of the pipe 71 by oil is thus avoided as this pipe is not on a lower level than the tank 22, as would appear from Figure 1 of the drawings.

Pipe 44 is extended to a branch line controlled by the valve 46 in order that samples may be tapped from this line during the operation of the apparatus to ascertain the quality of the purified product.

A closed receptacle 92 is connected with the pipe 47 and with pipe 10 through its upper and lower ends, respectively, by pipes 95 and 96, respectively. The connections between these pipes and receptacle 92 are in turn controlled by three-way valves 93 and 94. A pipe 75 interconnects the pipe 19 and the oil pump 16 and is controlled by a relief valve 76 for a purpose to be later described. A similar pressure relief valve is provided upon an extension 73 of the pipe 43 leading into the tank 22. A valve 77 normally prevents the flow of oil through a branch of the pipe 19 and may be opened to tap oil from this pipe when it is desired to ascertain the quality of the oil entering the system. The pipe 69 is extended outwardly to the right of its connection with pipe 70 as indicated in Figure 1 and is controlled by a valve 89 within this extension 88 thereof. The vacuum from the pump through this pipe 69 to the centrifuge is controlled by the valves 81 and 87 for purposes to be later explained and the flow of fluid to the pipe 23 is controlled by valve 79.

In the operation of the apparatus so far described, oil to be purified is introduced to pipe 10, passed through strainer 11 and then through pipes 12, 14 and 15 to oil pump 16, whence it is passed through heater 18 through control valve 20 and pipe 23 to feed nozzle 27 of the centrifugal rotor 26 within sealed casing 25. A large proportion of the water and other impurities in the oil are separated therefrom in rotor 26, these constituents occupying a zone "A" adjacent the inner periphery of the rotor, while the oil occupies a radially inner zone "B" within the water layer. The oil is thus continuously discharged through the orifice 38 of the rotor in a finely dispersed state, the water and other impurities being retained within the rotor. The layer "A" of water is subjected to a considerable degree of centrifugal force by reason of the rotation of the rotor and is also subjected to a very considerable pressure due to the centrifugal force acting upon the layer "B" of oil and thus indirectly exerting pressure against the layer of water with which it contacts. As a consequence of these two forces, the water within the rotor is under a very considerable degree of pressure and is thus unable to contaminate the vacuum within the hood 39 by its vapor. This segregation of the water from the oil before the oil is subjected to the action of the atmosphere conditioned to effect the removal of dissolved moisture and oxygen therefrom constitutes a very important feature of the invention. It will be seen that I have not only effected a physical separation of the water from the oil before subjecting the oil to the selective atmosphere into which it is thrown from the rotor, but that I have also provided an arrangement affording an effective seal of the water from the oil which is thus atmospherically conditioned and that by reason of this seal I have precluded all chance of a contamination of the evacuated atmosphere by the vapor of the water which has previously been removed from the oil in a liquid state.

Centrifuged oil falls in a curtain through the hood 39 and the inner walls of the casing 25, thus forming a thin layer which when subjected to the evacuated atmosphere within the interior of the casing readily gives up its dissolved moisture and other gases such as the oxygen entrained therein.

The oil which has thus been centrifuged and subjected to the atmospheric conditioning treatment passes by means of pipe 40 to tank 22 and is withdrawn from there through pipe 41 by oil pump 42 which is capable of increasing the pressure of the oil from the pressure existing in tank 22 to a pressure sufficient to pass the oil through filters 49. Oil leaving pump 42 through pipe 43 may be passed through filters 49 by opening one or both of valves 48 and is discharged thence to clean oil line 44; or the oil may be passed from pipe 43 directly to pipe 44 by opening valve 45 and closing valves 48 and 51.

In case an inspection of oil tapped from the valve 46 indicates that the purifying operation is not sufficiently thorough to effect the desired renovation of the oil a partial closing of the valves 45 and/or 48 may be resorted to to increase the pressure within the system and reduce the rate of flow. Such increase of pressure causes a backing up of oil within the pipe 73 and a flow thereof through pressure relief valve 74 into tank 22. It thus appears that any increase of pressure in the oil in the system by partial or complete closing of valves 45 or 48 or by partial or complete clogging of the filters 49 will cause a rise in the level of the liquid in the tank 22 and a partial closing of valve 20. Such operation causes oil to rise in tank 22 and restricts the flow of oil through the valve 20 to effect a diminution of the flow of oil from heater 18 through pipe 23 to the centrifuge. The by-pass line 75 with its relief valve 76 affords relief for the system under these circumstances to prevent a building up of pressure within pipe 19.

By the above described operation it will be apparent that the flow to the centrifuge is automatically regulated in case such flow is in excess of the capacity of the oil lines, valves and filters through which the oil passes in its return flow from the centrifuge to the oil storage container. As soon as the receiving system has allowed the flow of sufficient oil from the tank 20 to reduce the level of the float 21 the valve 20 will be again reopened to allow the flow of oil to the centrifuge.

Assuming that operation under vacuum is to be carried out, oil separator 63 is partly filled with heavy oil and valve 64 is opened to supply lubricant to vacuum pump 61, all other valves heretofore referred to being closed. The centrifugal rotor is brought up to speed while cover 34 is removed and that cover is thereafter securely fastened on the casing to effectively seal the interior of the casing from the atmosphere. Pumps 16, 42 and 61 are started and when vacuum gauge 78 indicates a vacuum of 27 inches of mercury below atmospheric pressure, valve 79 is opened and flow of oil through by-pass 75 will diminish or cease and oil will begin to pass through the centrifuge and into tank 22. When tank 22 is partly filled, valve 72 is opened to eliminate air from pump 42 and the oil lines with which it communicates, and if oil is to be filtered one or both of valves 48 are opened but if not, valve 45 is opened.

Inasmuch as the rate of discharge from the purifying system is controlled by valve 45 or valves 48, such flow is thereby regulated to maintain an oil temperature of approximately 140°; and since the discharge is so controlled the level of liquid in tank 22 will be controlled and the position of float 21 will automatically control the flow of oil from pipe 19 to pipe 23 and through the centrifuge, it being understood that neither pipe 19 nor pipe 23 communicates with the interior of tank 22.

In order to absorb gas and moisture from the pipe 69, absorbing chamber 83 may be connected with that pipe through a piping system including valves 82 on opposite sides of valve 81. A suitable gas and moisture absorbing substance is contained in the chamber 83 and absorbs a large portion of the gases within this piping system, thereby eliminating a large proportion of the impurities which might otherwise contaminate the system.

As an alternative to the operation of the vacuum system described above for the removal of impurities from the centrifuged oil, I may introduce a suitable inert gas such as nitrogen, carbon dioxide, or ordinary illuminating gas into the system. Such gas may be introduced into pipe 85 under control of valve 86. In such case the inert gas fills the interior of the casing and flows through pipe 40 and tank 22 and is vented from there to vent 88 controlled by valve 89, the valves 81 and 84 being closed during this operation. The flow of such gas may or may not be continuous and the absorption of moisture and gas by the absorber in chamber 83 may or may not be effected in connection with the supplied inert gas.

The displacement or removal of moisture and oxygen from the system may be effected in any one or more of the several ways described above without departing from the spirit of my invention. A volatile liquid, such for example as naphtha, may be added to the oil before treatment by the centrifuge in order to assist in the volatilization of the impurities.

While the apparatus may be used for the purification of various oils, as above stated, it is particularly adaptable for the purification of oils used for transformers and switches and in the illustrated embodiment is connected to a transformer casing 91 from which the oil is withdrawn through the pipe 10 and returned through the pipe 47 and valve 94. At the beginning of the operation, valves 93 and 94 are so set that pipes 10 and 47 both communicate with tank 92 and the purifying system is maintained in operation until by circulation of oil therethrough the interior of the apparatus is largely or completely free of moisture and undesirable gas. Thereupon valves 93 and 94 are shifted to put pipes 10 and 47 into communication with the interior of casing 91 and purification of the oil therein proceeds.

While I have described several alternative embodiments of my invention in order to illustrate the principle thereof, I wish it to be understood that the invention is by no means intended to be limited to the embodiments described or in any other way than by the scope of the sub-joined claims as interpreted in the light of the broad generic spirit of my invention.

What I claim and desire to secure by Letters Patent of the United States is:

1. A centrifugal separator including a casing, a centrifugal rotor within said casing having an opening through which liquid is adapted to be discharged in a dispersed condition, the interior of said casing affording a chamber in the neighborhood of the discharge zone having an elongated sloping wall surrounding the rotor along the major portion of its length and adapted to receive the liquid discharged from said rotor and convey it in a thin film for a substantial distance, and means for conditioning the atmosphere within said casing, whereby to afford intimate contact between the liquid and conditioned atmosphere during the flow of said liquid along said elongated wall.

2. A centrifugal separator including a casing, a centrifugal rotor within said casing having an opening through which liquid is adapted to be discharged in a dispersed condition, and a hood within said casing into which the liquid is adapted to be discharged, said hood being provided with a series of openings and with a series of baffles having deflecting portions projecting into the path of liquid impelled toward said openings under the influence of centrifugal force and designed to deflect said liquid away from said openings.

3. A centrifugal separator including a casing, a centrifugal rotor within said casing having an opening through which liquid is adapted to be discharged in a dispersed condition, a hood within said casing into which the liquid is adapted to be discharged, said hood being provided with a series of openings and with a series of baffles having deflecting portions projecting into the path of liquid impelled toward said openings under the influence of centrifugal force and designed to deflect said liquid away from said openings, and means for conditioning the atmosphere within said casing and hood.

4. A centrifugal separator including a casing, a centrifugal rotor within said casing having an opening through which liquid is adapted to be discharged in a dispersed condition, a hood within said casing into which the liquid is adapted to be discharged, said hood being provided with a series of openings and with a series of baffles having deflecting portions projecting into the path of liquid impelled toward said openings under the influence of centrifugal force and designed to deflect said liquid away from said openings, and means for applying a vacuum to the atmosphere within said casing and said hood.

5. A centrifugal separator including a casing, a centrifugal rotor within said casing having an opening through which liquid is adapted to be discharged in a dispersed condition, the interior of said casing affording a chamber in the neighborhood of the discharge zone having an elongated sloping wall surrounding the rotor along the major portion of its length and adapted to receive the liquid discharged from said rotor and convey it in a thin film for a substantial distance, and means for conditioning the atmosphere within said casing, whereby to afford intimate contact between the liquid and conditioned atmosphere during the flow of said liquid along said elongated wall, and a hood within said casing adapted to surround the portion of the casing to which the liquid is discharged, said hood being provided with a series of openings and with a series of baffles having deflecting portions projecting into the path of liquid impelled toward said openings under the influence of centrifugal force and designed to deflect said liquid away from said openings.

6. A centrifuge comprising a housing, a rotor within the housing having discharge openings for discharging liquid in a dispersed state after centrifugation, a large chamber within the housing surrounding the rotor and extending for a substantial distance longitudinally thereof, said chamber receiving the dispersed discharge from said opening and affording a long sloping surface along which the discharged liquid is adapted to flow in a thin film, and means for conditioning the air in the chamber.

LEO D. JONES.